July 2, 1957     J. PETERHANS     2,797,723
APPARATUS FOR THE MANUFACTURE OF SLIDE FASTENERS
Filed Nov. 20, 1952     4 Sheets-Sheet 1

INVENTOR·
Josef Peterhans,
BY
ATTORNEY

July 2, 1957 J. PETERHANS 2,797,723
APPARATUS FOR THE MANUFACTURE OF SLIDE FASTENERS
Filed Nov. 20, 1952 4 Sheets-Sheet 2
Fig. 2
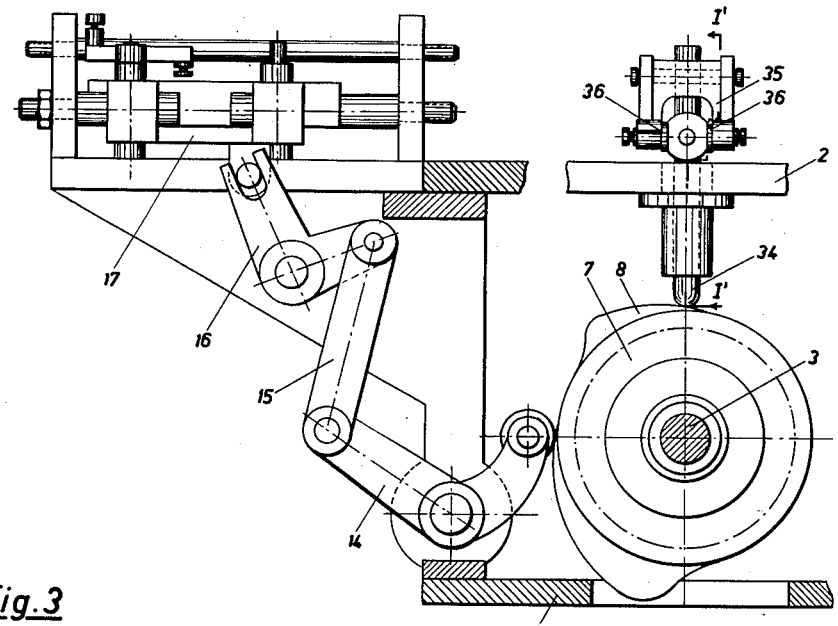
Fig. 3
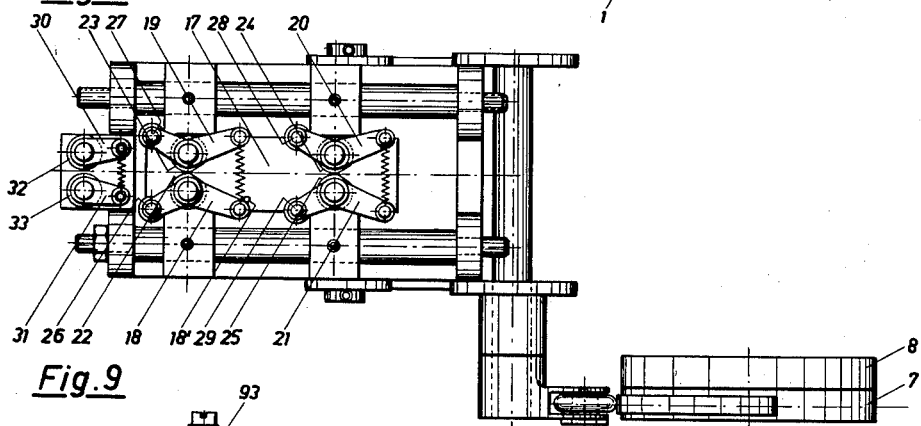
Fig. 9
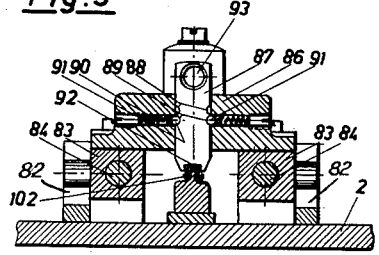
INVENTOR
Josef Peterhans,
BY
ATTORNEY July 2, 1957 J. PETERHANS 2,797,723
APPARATUS FOR THE MANUFACTURE OF SLIDE FASTENERS
Filed Nov. 20, 1952 4 Sheets-Sheet 3
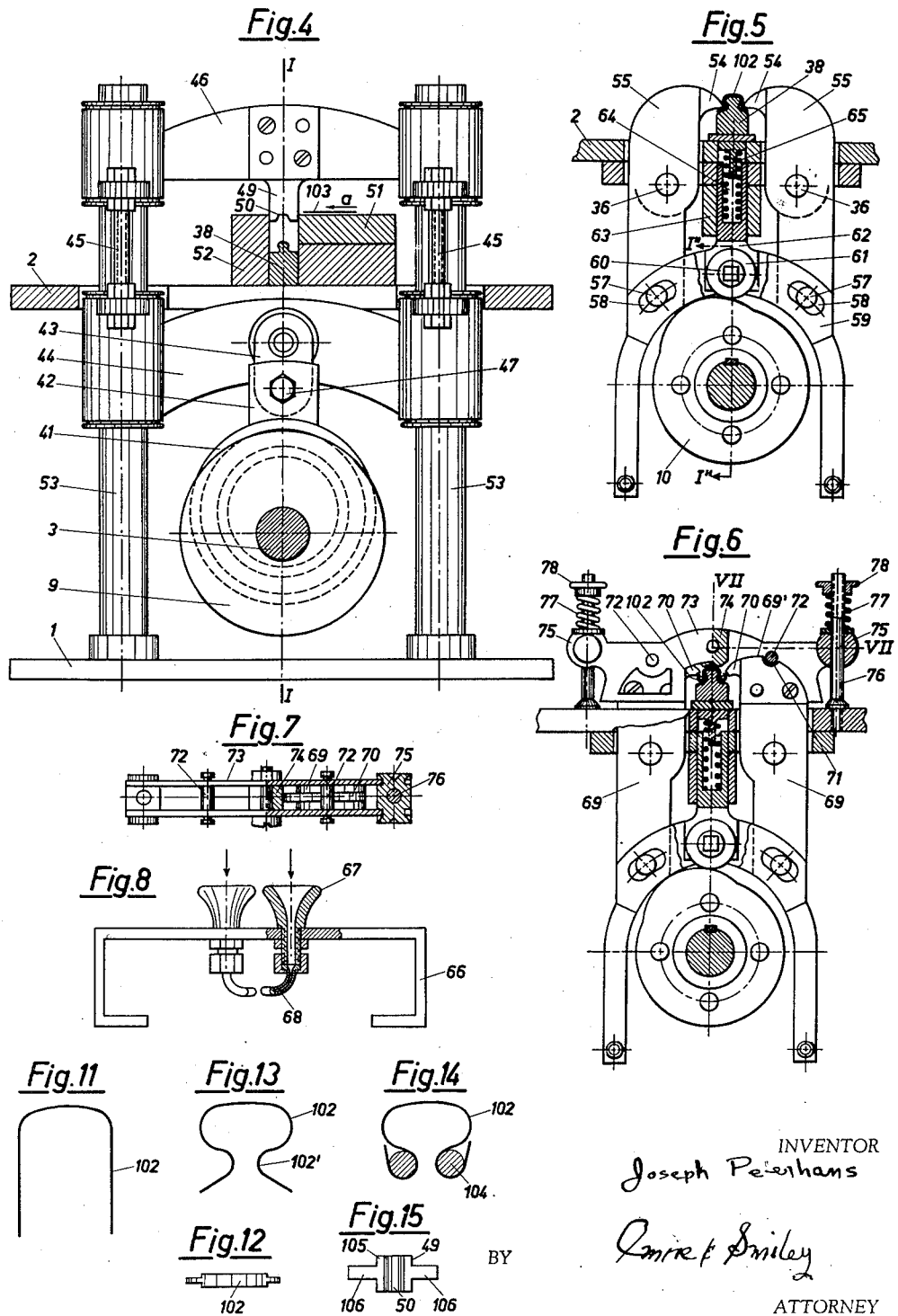
INVENTOR
Joseph Peterhans
BY
ATTORNEY

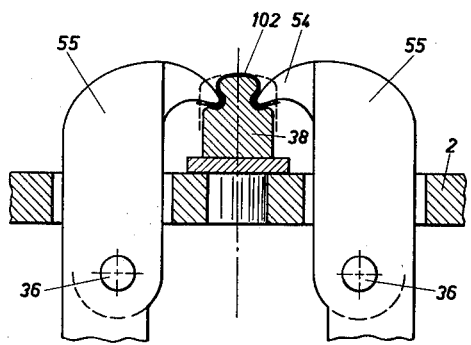
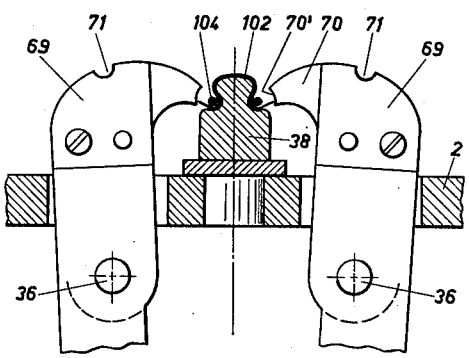
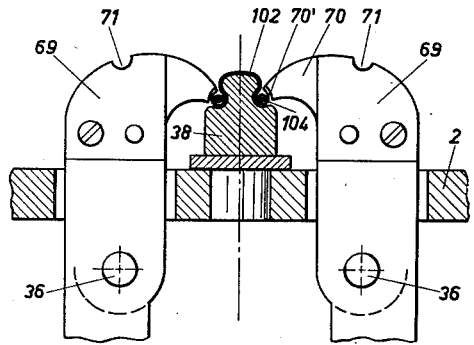
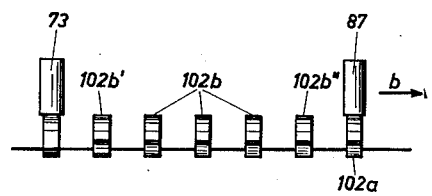
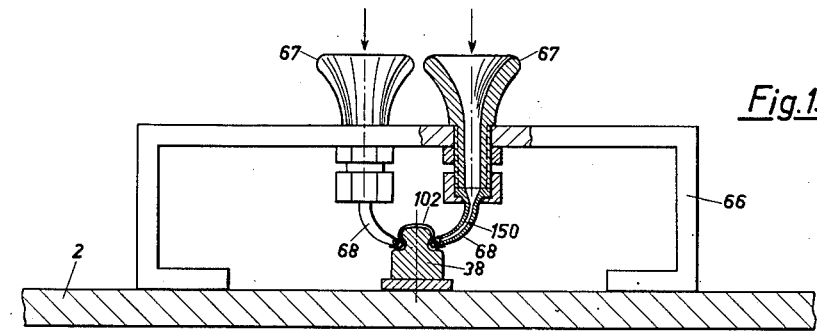

United States Patent Office 2,797,723
Patented July 2, 1957

2,797,723

APPARATUS FOR THE MANUFACTURE OF SLIDE FASTENERS

Josef Peterhans, Zurich, Switzerland

Application November 20, 1952, Serial No. 321,695

Claims priority, application Austria September 12, 1952

4 Claims. (Cl. 153—1)

The invention relates to an advantageous apparatus for the manufacture of the so-called invisible slide fasteners, which comprise several slide bails embracing beads at the edges of the parts, usually textiles or the like, that are to be connected, the beads being arranged at the inside of the garment or the like. Said slide bails are fixed at certain intervals to cords extending at their sides. To open the fastener the slide bails are pushed together toward one end of the fastener, or of the fabric edges to be connected.

The work of the apparatus according to the invention consists in separating from elongated ductile starting material, such as strip or wire, the lengths intended for the manufacture of the links, forming them into U-shaped bails, then drawing in the limbs further, inserting a cord into each of the portions thus drawn in, and finally doubling the limb ends around the cords to clamp the same fast.

Apparatus forming the subject of the invention comprises feeding means to move the starting wire or strip below the first tool, means to separate and at the same time shape the material for the first time, whereby the material is cut to the necessary length and formed into U-shaped bails, the limbs of which are of smaller width than the crosspieces, transporting means to feed the bails to the next units, pressing means to draw in the limbs for the first time beyond the U-shape, a thread guide for introducing the cord, which connect the links, into the drawn-in portions of the bails, a second pressing means for further drawing in the U-shaped bails and clamping the same to the cords, and spacing and extracting means for the lined-up fastener links.

Another feature of the invention resides in the arrangement of a common drive shaft provided with camwheels to operate the units performing the successive feeding, separating, forming and transporting steps.

An embodiment of the apparatus according to the invention is shown by way of example in the drawing:

Fig. 2 is a cross sectional view showing the feeding means for the starting material taken substantially along the plane of section line II—II of Fig. 1;

Figure 1:
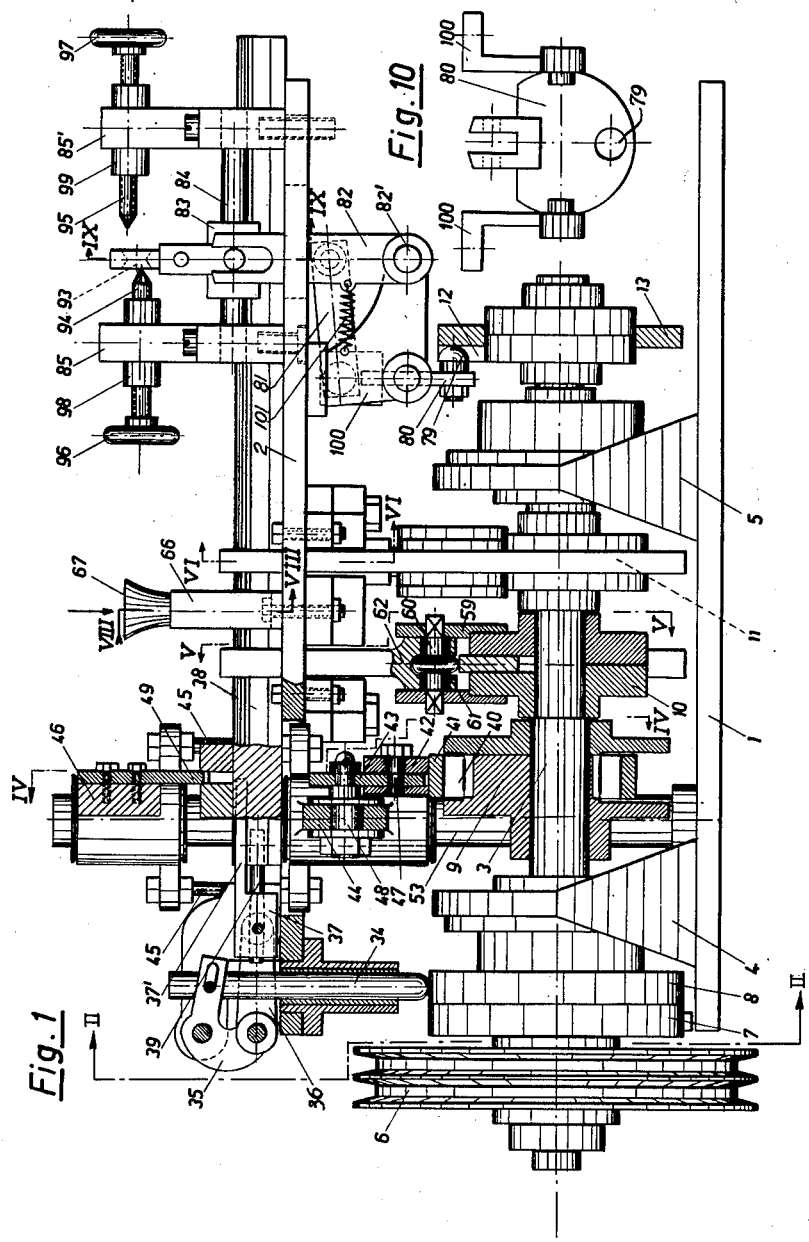
Fig. 1 is a side view showing the apparatus with sectional views taken along lines I—I of Fig. 4, I'—I' of Fig. 2, and I"—I" of Fig. 5, respectively.

Fig. 3 a top plan view thereof;

Fig. 4 is a sectional view of the apparatus, taken along line IV—IV of Fig. 1;

Fig. 5 is a sectional view of the apparatus, taken along line V—V of Fig. 1;

Fig. 6 is a sectional view of the apparatus, taken along line VI—VI of Fig. 1, the left-hand half being shown in elevation;

Fig. 7 is a top plan view showing the apparatus partly in a sectional view taken along line VII—VII of Fig. 6;

Fig. 8 is an elevation showing the thread guide partly in a sectional view taken along line VIII—VIII of Fig. 1;

Fig. 9 is a sectional view taken along the line IX—IX of Fig. 1 and showing the holding-down member;

Fig. 10 is an elevation of the rocker lever;

Further, Figs. 11, 13, and 14 are elevations showing the slide bail in various of its manufacture;

Fig. 12 is a top plan view showing the slide bail in the stage shown in Fig. 11;

Fig. 15 is a top plan view of the working face of the punching and pressing tool;

Figs. 16, 17 and 18 are enlarged fragmentary views similar to Fig. 5 and showing subsequent stages of manufacturing the bail;

Fig. 19 is a view similar to Fig. 8 and showing the feeding of the cord to the gripper, and Fig. 20 is a fragmentary view in elevation of a cord having links attached thereto in spaced relation.

Apparatus according to the invention comprises a base plate 1, which is connected by spacing columns (not shown) to the top plate 2. The drive shaft 3 is carried in the bearing pedestals 4 and 5 of the base plate 1, and connected to a motor (not shown) by the belt pulley 6. By means of eccentrics and cams the drive shaft 3 is connected to the working tools required for the manufacture of the fastener, the cam 7 operating the starting material feeding means, the cam 8 the transporting means for the preformed links, the eccentric 9 the first die to preform the links, and the cams 10 and 11 the second and third tools, respectively, which further shape the links. Finally, the disk 13, provided with the axially protruding cam 12, operates the means determining the spacing of the several links in the finished slide fastener and extracting the same from the machine.

The cam 7 through the intermediary of the bell crank 14, the push rod 15, and the bell crank 16 operates the carriage 17 of the starting material feeding means (Fig. 2). Spring-loaded drive levels 18, 19, 20, 21, carrying flattened drive rollers 22, 23, 24, 25, are mounted at 26, 27, 28, 29, in the carriage 17 (Fig. 3). Moreover, a stop pin 18' is provided at the carriage 17. The spring-loaded levers 30, 31 with the rollers 32, 33 form the non-return means for the starting material to be fed.

The cam 8 operates a plunger 34, which transmits its reciprocating motion through the bell crank 35 and the push rods 36 to the transporting means 37, which has at its front end a forked part 37' whose two prongs are disposed before and behind the rail 38 and thus embrace the end of the rail 38, as is apparent from Fig. 1. In the drawing which shows a longitudinal sectional view of the fork, only the rear prong is shown which is partly covered by the end of the rail 38. Said fork pushes the bails ahead which have been formed under the first tool. The transporting means 37 and slides on the guide rail 39 fixed in the continuous profile rail 38 (Fig. 1).

The eccentric disk 9 forms the inner race for the roller bearing 40, the outer race 41 of which moves through the intermediary of the eyes 42 and the link plate 43 the crosspiece 44, to which the carriage 46 is connected with spacing screws 45. The link plate 43 is connected to the eyes 42 and the crosspiece 44 by the pins 47 and 48, respectively. The carriage 46 carries the punch 49 necessary to separate a part length from the starting material and form it for the first time to obtain a U-shaped bail. To this end the punch has a recess 50, which co-operates with the continuous profile rail 38. As shown in Fig. 15, the working face of that punch has a rectangular central part 105 with rectangles 106 adjoining in the direction of material feed and being of smaller width than the central part. This punch is suitable for working and separating starting strip as well as wire. In both cases the operation of separating and deforming produces a U-shaped bail, the limbs or flanges of which are smaller in width than the crosspieces or webs. Where the tool is to be used only with wire, the working face of the punch may be rectangular. The die cooperating with the punch 49 is formed by the parts 51 and 52, the shape of which corresponds to the plan contour of the punch. The crosspiece 44 and the carriage 46 are guided on columns 53 fixed in the base plate 1 and extending through the top plate 2.

The next unit, provided to draw in the limbs of the bail beyond the U-shape, is driven by means of the cam 10. The tool itself consists of the jaws 54 cooperating with the profile rail 38 and fixed to the shorter arms of levers 55 (Fig. 5). The levers 55 are rotatably supported in the top plate 2 by means of pins 56 and have at their longer arms studs 57 sliding in oblique slots 58 of the crossbails 59. The crossbails 59 receive the square ends of the pin 60 supporting the roller 61 and the plunger 62. The plunger 62 is guided in the box 63 and has a bore 64 in which a spring 65 is provided, which bears against the top plate 2, and continuously urges the plunger 62 with the roller 61 against the camwheel 10.

By the rotation of the cam 10 the bolt 62 and with it the crossbails 59 receive a vertical reciprocating movement. By the oblique position of said slots 58, the bolts 57 are urged to move outwards and to spread the lower ends of the levers 55. The upper parts of levers 55 supporting the tools 54, naturally move together.

Behind the unit described last the top plate 2 has attached to it by means of the frame 66 (Fig. 8) on both sides of the rail 38 a nozzle 67 of the thread guide, which has an extension formed with a through bore 68 for guiding the cords connecting the several links closely to the drawn-in position 102' of the limbs of said links.

The thread guide is followed by the tool which clamps the links to the cords and the drive mechanism of which has between the camwheel 11 and the tool holders 69 the same elements as are arranged between the camwheel 10 and the levers 55, as described. The tool itself consists of the jaws 70 cooperating with the profile rail 38 and which are fixed to the shorter arms of levers 69. The levers 69 are rotatably supported in the top plate 2 by means of pins 56' and have studs 57' on their longer arms sliding in oblique slots 58' of the crossbails 59'. The crossbails 59' receive the square ends of the pin 60' supporting the roller 61' and the plunger 62'. The plunger 62' is guided in the box 63' and has a bore 64', in which is provided a spring 65'. This spring bears against the top plate 2 and continuously urges the plunger 62' with the roller 61' against the camwheel 11. The tool holders 69, carrying tools 70, have grooves 71 cooperating with bolts 72 of the spring-loaded crossbails 73. The crossbails 73 are connected at their center by the holding-down member 74, and at their ends by the guide blocks 75. The guide blocks slide on the bolts 76 fixed in the top plate 2 and are urged downwardly by the springs 77. The prestressing of the springs 77 can be adjusted by means of the knurled screws 78.

The pulling of the cords from bobbins (not shown) and the pulling of the cords through the drawn-in portions 102' of the links 102 not yet clamped is effected by means of a gripper 87 of a spacing and pulling device (Figs. 1 and 9), which will be described hereinafter.

In Fig. 6 it is seen, that there is a space between the grooves 71 and the bolts 72, when the crossbails 73 are pressed down by the springs 77. In this case, the holding down member 74 is pressed against the profile rail 38 or a bail 102 lying on said rail under the tools 70 respectively and the tools 70 have a distance of the rail 38.

If the tool-holders 69 with the tools 70 are urged together, the bolts 72 disengage with the grooves 71 and mount the outer rim of said grooves. By this movement, the crossbails 73 and the holding-down member 74 come in a higher position as it is shown in Fig. 6. Before the tools 70 touch the legs of the bails 102, the member 74 is lifted; in this position of said parts it is possible to push away the bail 102 on the rail 38 and bring the next bail under the member 74.

The last wheel 13 which is provided on the drive shaft 3 and has an axial cam 12 is connected to the slide-pieces 83 of the spacing and extracting unit through the intermediary of the plunger 79, the rocker lever 80, the push rod 81, and the drive fork 82. The slide pieces 83 are guided on the rods 84 fixed in the frames 85 and 85' and are rigidly interconnected by the bridge 86 (Figs. 1 and 9). The gripper 87 is guided in the bridge 86 for vertical adjustment and has recesses 88, 89, into which the locking balls 91, loaded by the spring 90, are adapted to snap. The lower end of the gripper 87 is provided with an aperture 92 conforming to the fastener links and has in its upper part a round aperture 93 enlarged outwardly toward both ends in conical shape. At different levels above the top plate 2, the frames 85, 85' have arranged therein engaging pins 94 which have tapered ends and knurled disks 96, 97, and are screwed into the crosspieces 98, 99 of the frames. The rocker lever 80 is mounted in eyes of the bearing block 100. The spring 101 is provided between the bearing block 100 and the drive fork 82.

Hereinafter the manufacture of a slide fastener from starting wire will be described.

The wire is passed through the clamping rollers 32, 33, and advanced until it can be gripped by the drive rollers 22, 23, 24, and 25 of the carriage 17. The reciprocating motion of the carriage 17 derived from the camwheel 24 moves the wire step by step under the punch 49. During the forward stroke of the carriage 17 the drive rollers clamp the wire fast with their flattened portions and the spring which forces the bell cranks 18, 19, 20, 21 together in pairs, the wire passing freely between the rollers 32 and 33 in the feeding direction. As the carriage 17 returns, the rollers 22, 23, 24, 25 turn through a small angle, the rollers 23, 24 turning in the counterclockwise and the rollers 22, 25 in the clockwise senses, to move their flattened portions out of contact with the wire. Thus the levers 18, 19, 20, 21 are turned from the wire and strain the spring connecting the levers of each pair. In this operation the wire is held fast by the spring-loaded rollers 32, 33 to prevent it from being taken along by the returning carriage 17. The bell cranks 18, 19 are prevented by the stop pin 18' from turning too far beyond their central position. The length of feed is about as long as the wire part to be formed into a slide bail. After the wire has been advanced in the direction of the arrow $a$ (Fig. 4) below the cutting tool, the length of wire lying between parts 51, 52 is cut and urged by the cutting tool 49 against the profile rail 38. In this operation the recessed portion 50 bends the wire ends and at the same time spreads the wire part lying on the top of the rail 38. Thus a link is produced of the shape shown in elevation and plan in Figs. 11 and 12, respectively. The up-and-down motion of the cutting tool 49 is derived from the drive shaft 3 through the intermediary of the eccentric disk 9, the roller bearing 40, the outer race 41 thereof with the eyes 42, the link plate 43, the crosspiece 44, the spacing screws 45 and the carriage 46. The fine adjustment of the height of the tool 49 relative to the profile rail 38 is effected by means of the spacing screws 45.

After that operation has been completed the transporting means 37 advances and pushes the bail 102 on the profile rail 38, which extends below all tools, until the bail is out of the range of the tool 49. Then the next length of wire is separated, preformed, and the bail thus formed is pushed to the foregoing one. Thus a row of mutually adjoining bails is formed, which are advanced through the width of one bail every time a new preformed bail is transported, whereby the bails are fed in succession to the next tool. Here the bails are formed by the jaws 54 urging the bail limbs against the construction at the central part of the profile rail 38 to provide them with the drawn-in portions 102 (Fig. 13), into which the cords 104 are subsequently inserted by the thread guide. The mutually opposite motions of parts 54 is produced by the rotation of the camwheel 10, which through the intermediary of the rollers 61 urges the plunger 62 and the crossbails 59, mounted on the square ends of the bolt 60, upwardly against the force of the spring 65. By their upward movement the crossbails 59 urge the lower parts of the levers 55 outwardly through the intermediary of bolts 57 sliding in slots 58. Thus the parts 54 are moved towards each other.

After the insertion of the cords 104 into the drawn-in portions 102' of the bails 102, which operation has been described already and follows the tool described last, the bail ends are drawn in further by the last pressing tool and are pressed against the cords 104 to clamp the same fast (Fig. 14). The movement of the last presstool is effected in the same manner as in the case of the tool 54 described last.

After that operation the bails clamped to the cord must be advanced by the gripper 87 through the desired distance between two links on the finished slide fastener, before the next bail is clamped fast. The gripper 87 being at a certain distance from the last pressing tool, the links will adjoin in the first part of the finished fastener through a length corresponding to that distance. That part of the finished fastener is removed after it has left the apparatus.

During the pulling of a clamped link by the gripper 87, it is desired to prevent the next link, which has not been clamped yet, from being carried along beyond the clamping tool by the sudden pulling of the cord. To this end the next link lying between the jaws 70 is forced from above against the profile rail 38 by the holding-down member 74 of the crossbail 73 under the force of the springs 77. The necessary up-and-down motion of the crossbail 73 is effected by the bolts 72 sliding on the upper cam faces 69', which are provided on the levers 69 and have recesses 71, the downward movement of the crossbail to hold the link to be clamped being effected by the bolts 72 snapping into the recesses 71.

The gripper 87 functions as follows: As the camwheel 13 is turned the plunger 79 and with it the rocker lever 80 are turned in the clockwise sense. Thereby the drive form is turned about the pivot 82' in the same sense, through the intermediary of the push rod 81. Thus the slide pieces 83 are moved to the right on the rods 84, when seen in the direction of extraction and the gripper 87 mounted in the bridge 86 takes one fastener link along. At the end of its motion the gripper 87 engages the tapered end of the engaging pin 95 with the upper part of the surface limiting the aperture 93. Thus the gripper is lifted to release the link it has carried along. During its return motion effected by the spring 101 the gripper is held in that elevated position by the spring-loaded balls 91 snapping into the lower depressions 89. In the left-hand end position the lower part of the limiting surface of the aperture 93 engages the tip of the engaging pin 94 to urge the gripper downwardly and behind the next link. Again the gripper is held fast in that position by the balls 91 snapping into the depressions 88. Thereafter the cycle described is repeated.

I claim:

1. In an apparatus for the manufacture of slide fasteners having links, said apparatus including feeding means for feeding elongated ductile starting material into the apparatus, said feeding means comprising a carriage, means to reciprocate said carriage, pairs of mutually opposite clamping rollers pivotally mounted on said carriage, springs mounted on said carriage and cooperating with said clamping rollers to urge the clamping rollers of a pair against each other, said clamping rollers having flattened peripheral portions and being adapted to take along said starting material when being moved forwardly and to pass over said material when returning, spring-loaded additional clamping rollers for holding said starting material fast during the return motion of said carriage, separating means comprising a combined cutting and forming tool for separating from the starting material the lengths required for successive links and to shape said lengths into U-shaped bails, transporting means for transporting said U-shaped bails through the apparatus, a first pressing means to draw in the limbs of said U-shaped bails beyond the U-shape to obtain draw-in portions, inserting means to insert cords into said draw-in portions, a second pressing means to draw in the U-shaped bails further and clamp the same to said cords in order to connect the links formed by said bails and line them upon said cords, extracting means for spacing the links on said cords from each other and extracting them, said extracting means having an alternating gripper with means to reciprocate said gripper and engaging means adjacent the end positions of the gripper and adapted to cooperate therewith to alter automatically the vertical position of said gripper, said second pressing means having a holding-down member operable to hold a bail situated in the range of said second pressing means when the preceding bails which have been clamped to the cords already are being extracted, all of said separating, feeding, transporting, pressing and extracting means are successively aligned and driven by a common drive shaft having camwheels thereon, and a profile rail shaped in conformity with the shape of the draw-in portion of the bail limbs and extending below all said means and providing a guideway for the sliding movement of said bails from one of said means to the other, the camwheel associated with said extracting means having an axial cam, and means actuated by said axial cam for moving said gripper and including a plunger cooperating with said axial cam, a rocker lever, a push rod, a bearing block, a driving fork, a spring connecting said driving fork to said bearing block, a bridge carrying said gripper, rods for guiding said bridge, and a bolt-and-slot coupling interposed between said driving fork and said bridge to drive said bridge.

2. In an apparatus for the manufacture of slide fasteners having links, said apparatus including feeding means for feeding elongated ductile starting material into the apparatus, said feeding means comprising a carriage, means to reciprocate said carriage, pairs of mutually opposite clamping rollers pivotally mounted on said carriage, springs mounted on said carriage and cooperating with said clamping rollers to urge the clamping rollers of a pair against each other, said clamping rollers having flattened peripheral portions and being adapted to take along said starting material when being moved forwardly and to pass over said material when returning, spring-loaded additional clamping rollers for holding said starting material fast during the return motion of said carriage, separating means comprising a combined cutting and forming tool for separating from the starting material the lengths required for successive links and to shape said lengths into U-shaped bails, transporting means for transporting said U-shaped bails through the apparatus, a first pressing means to draw in the limbs of said U-shaped bails beyond the U-shape to obtain draw-in portions, inserting means to insert cords into said draw-in portions, a second pressing means to draw in the U-shaped bails further and clamp the same to said cords in order to connect the links formed by said bails and line them up on said cords, extracting means for spacing the links on said cords from each other and extracting them, said extracting means having an alternating gripper with means to reciprocate said gripper and engaging means adjacent the end positions of the gripper and adapted to cooperate therewith to alter automatically the vertical position of said gripper, said second pressing means having a holding-down member operable to hold a bail situated in the range of said second pressing means when the preceding bails which have been clamped to the cords already are being extracted, all of said separating, feeding, transporting, pressing and extracting means are successively aligned and driven by a common drive shaft having camwheels thereon, and a profile rail shaped in conformity with the shape of the draw-in portion of the bail limbs and extending below all said means and providing a guideway for the sliding movement of said bails from one of said means to the other, and a baseplate, said engaging means including two bolts having tapered ends and mounted at different levels above said baseplate and adjacent the end positions of said gripper with the higher bolt disposed at the side of said gripper facing in the direction of extraction, said gripper having at its upper end an opening conically widening outwardly towards both ends thereof and being adapted to cooperate with said bolts.

3. In an apparatus for the manufacture of slide fasteners having links, said apparatus including feeding means for feeding elongated ductile starting material into the apparatus said feeding means comprising a carriage, means to reciprocate said carriage, pairs of mutually opposite clamping rollers pivotally mounted on said carriage, springs mounted on said carriage and cooperating with said clamping rollers to urge the clamping rollers of a pair against each other, said clamping rollers having flattened peripheral portions and being adapted to take along said starting material when being moved forwardly and to pass over said material when returning, spring-loaded additional clamping rollers for holding said starting material fast during the return motion of said carriage, separating means comprising a combined cutting and forming tool for separating from the starting material the lengths required for successive links and to shape said lengths into U-shaped bails, transporting means for transporting said U-shaped bails through the apparatus, a first pressing means to draw in the limbs of said U-shaped bails beyond the U-shape to obtain draw-in portions, inserting means to insert cords into said draw-in portions, a second pressing means to draw in the U-shaped bails further and clamp the same to said cords in order to connect the links formed by said bails and line them up on said cords, extracting means for spacing the links on said cords from each other and extracting them, said extracting means having an alternating gripper with means to reciprocate said gripper and engaging means adjacent the end positions of the gripper and adapted to cooperate therewith to alter automatically the vertical position of said gripper, said second pressing means having a holding-down member operable to hold a bail situated in the range of said second pressing means when the preceding bails which have been clamped to the cords already are being extracted, all of said separating, feeding, transporting, pressing and extracting means are successively aligned and driven by a common drive shaft having camwheels thereon, and a profile rail shaped in conformity with the shape of the draw-in portion of the bail limbs and extending below all said means and providing a guideway for the sliding movement of said bails from one of said means to the other, and a baseplate, said engaging means including two bolts having tapered ends and mounted at different levels above said baseplate and adjacent the end positions of said gripper with freedom of axial sliding movement, the higher bolt being disposed at the side of said gripper facing in the direction of extraction, and means to set said bolts in position, said gripper having at its upper end an opening conically widening outwardly towards both ends thereof and being adapted to cooperate with said bolts.

4. In an apparatus for the manufacture of slide fasteners having links, said apparatus including feeding means for feeding elongated ductile starting material into the apparatus said feeding means comprising a carriage, means to reciprocate said carriage, pairs of mutually opposite clamping rollers pivotally mounted on said carriage, springs mounted on said carriage and cooperating with said clamping rollers to urge the clamping rollers of a pair against each other, said clamping rollers having flattened peripheral portions and being adapted to take along said starting material when being moved forwardly and to pass over said material when returning, spring-loaded additional clamping rollers for holding said starting material fast during the return motion of said carriage, separating means comprising a combined cutting and forming tool for separating from the starting material the lengths required for successive links and to shape said lengths into U-shaped bails, transporting means for transporting said U-shaped bails through the apparatus, a first pressing means to draw in the limbs of said U-shaped bails beyond the U-shape to obtain draw-in portions, inserting means to insert cords into said draw-in portions, a second pressing means to draw in the U-shaped bails further and clamp the same to said cords in order to connect the links formed by said bails and line them up on said cords, extracting means for spacing the links on said cords from each other and extracting them, said extracting means having an alternating gripper with means to reciprocate said gripper and engaging means adjacent the end positions of the gripper and adapted to cooperate therewith to alter automatically the vertical position of said gripper, said second pressing means having a holding-down member operable to hold a bail situated in the range of said second pressing means when the preceding bails which have been clamped to the cords already are being extracted, all of said separating, feeding, transporting, pressing and extracting means are successively aligned and driven by a common drive shaft having camwheels thereon, and a profile rail shaped in conformity with the shape of the draw-in portion of the bail limbs and extending below all said means and providing a guideway for the sliding movement of said bails from one of said means to the other, said gripper having recesses arranged in accordance with its two vertical positions and said extracting means including spring-loaded balls adjacent said recesses and adapted to snap into the same when said gripper is in its end positions.

References Cited in the file of this patent

UNITED STATES PATENTS

| | | |
|---|---|---|
| 1,169,698 | Von Vass | Jan. 25, 1916 |
| 1,282,530 | Bloemker | Oct. 22, 1918 |
| 1,304,780 | Kepler | May 27, 1919 |
| 1,342,712 | Garllus et al. | June 8, 1920 |
| 1,720,133 | LeRoy | July 9, 1929 |
| 2,092,255 | Keller | Sept. 7, 1937 |
| 2,738,822 | Stark | Mar. 20, 1956 |